May 12, 1931.                R. SCHARF                1,804,813
EDUCATIONAL DEVICE
Filed Jan. 31, 1928
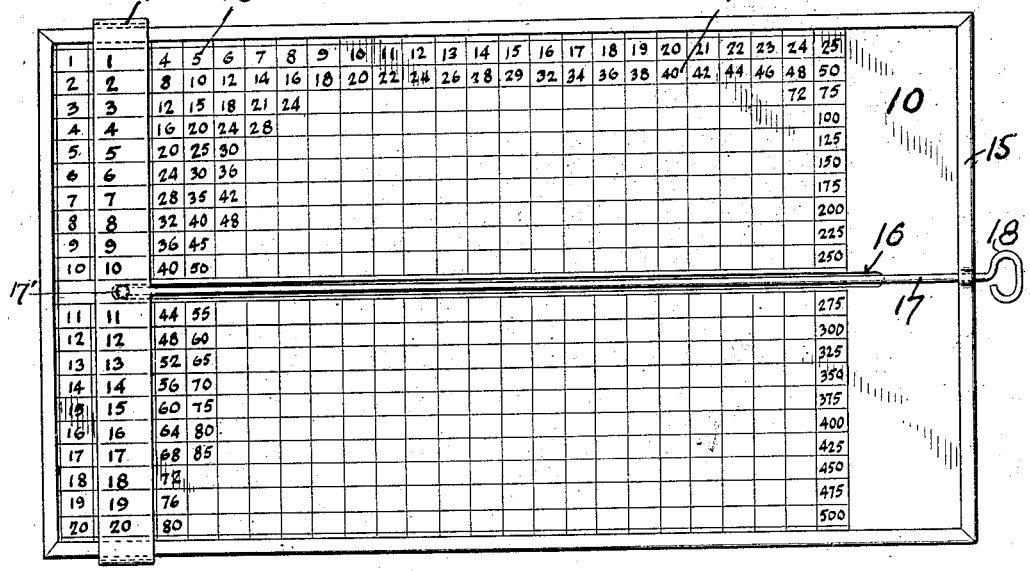
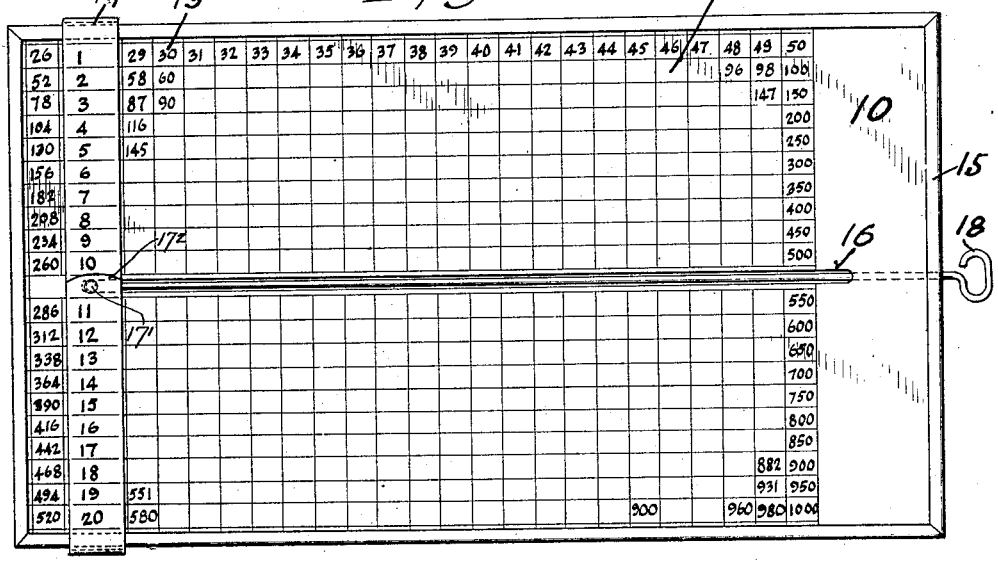
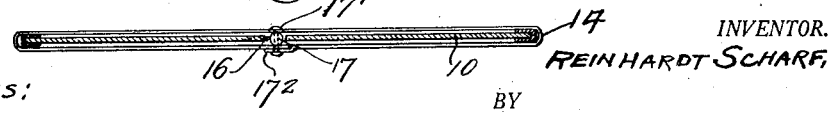
INVENTOR.
REINHARDT SCHARF,
BY
ATTORNEYS.
WITNESS:

Patented May 12, 1931

1,804,813

UNITED STATES PATENT OFFICE

REINHARDT SCHARF, OF THIENSVILLE, WISCONSIN

EDUCATIONAL DEVICE

Application filed January 31, 1928. Serial No. 250,763.

The invention relates to devices for multiplying numerals, and is primarily intended for the use for pupils in graded schools, but its features of construction are such that it is adaptable for use, within the limitations of the particular structure in which the invention is embodied, in the transaction of business affairs.

The device comprises a surface constituting a table on which the multiplicand within a reasonable range is placed, together with certain multiples thereof within the limits of the particular device, and a multiplier having a range corresponding with the multiples, so that as the multiplier is moved over the table until the selected multiplicand is reached, the product representing the multiplier times the multiplicand is indicated upon the table.

The invention will now be described in detail, and the novelty thereof pointed out in the appended claims.

In the accompanying drawings:

Figure 1 is a face view of a device constructed in accordance with my invention, the multiplicand having a limited range.

Fig. 2 is a back view of the device, showing the multiplicand as extended to embrace an additional range.

Fig. 3 is a transverse section, showing certain features of construction.

In the drawings, the numeral 10 indicates a flat sheet of some suitable material, such as card board or celluloid, and having plane surfaces on one or both of which tables 11, 12, may be printed, for the purpose of my invention. Each surface is preferably ruled in two directions, to provide spaces in which numbers 13, indicating the multiplicand are arranged in vertical columns and in arithmetical progression from the top to the bottom of the table. In the vertical arrangement shown in Fig. 1, such numbers range from 1 to 20, and in the horizontal rows following a like progression from left to right, the numbers range from 1 to 25. Hence, at the intersection of any vertical column and horizontal row, there will appear the product of the multiplication of the number at the top of the selected column by the number at the left of the selected row.

But to facilitate the ascertainment of the product resulting from the multiplication of the desired numbers, without the effort of following the lines of numbers to the points of their intersection, I provide the sheet with a sliding multiplier 14, having thereon numbers corresponding with those in the vertical column at the left, and move the sliding multiplier along the sheet until the edge of the sliding multiplier is brought into proximity to the vertical column presenting the desired multiplicand. The pupil will then locate the desired number on the sliding multiplier 14, and find immediate thereto the product of the multiplication.

The sheet 10 preferably is framed with a thin metal binding 15 to preserve its flat state, and resist bending pressure, such as would interfere with the efficient and easy operation of the device. The sliding multiplier is formed from a strip, preferably of metal, and is bent into a loop so as to encircle the sheet 10, but is free for a sliding movement thereover.

The sheet 10 is provided lengthwise at its middle line with a slit 16, and the metal binding 15 at the right hand end of the sheet 10, is perforated at a point in line with the slit 16. A pull and push rod 17, having a handle 18 at its outer end, is passed through the said perforation and is arranged to lie in the space forming the slit 16 in the sheet. The inner end of the rod 17 is firmly attached to the sliding multiplier 13, so that in the in and out movements of the rod, the sliding multiplier is moved also.

The connection between the inner end of the rod 17 and the sliding multiplier, may be made by inserting the end of the rod between the sides of the strip forming the movable multiplier, and passing a rivet 17' through the parts at the overlapping end $17^2$ of the strip. In such construction, the end of the rod serves to space the sides of the loop from contact with the sheet 10, and avoids wearing of the printed matter on the surface of the sheet. The manner of such connection may be varied into other forms, but the feature of entering the inner end of the rod 17, between the sides of the loop is preferable for the reason before stated.

In the foregoing, I have described the construction illustrated in Fig. 1. It will be understood that Fig. 2 shows simply the reverse side of the device, with the range of the multiplicand increasing from 26 to 50. The value of the movable multiplier 13 is the same on both of its sides.

Having thus described my invention, what I claim and desire to secure by Letters Patent of the United States, is:

1. A multiplying device formed as a sheet having numbers on both sides thereof arranged in arithmetical progression in vertical columns and horizontal rows, a sliding multiplier formed as a band encircling the sheet and provided on each side with numbers arranged in arithmetical progression, a rod supported and guided for longitudinal movement at one end at the edge of the sheet and attached at its other end to the said band and spacing the latter from the surfaces of the sheet to avoid wearing such surfaces, whereby when the rod is operated longitudinally to move the band to position the movable multiplier in proximity to a selected vertical column on the sheet, the product of the multiplication of the number at the top of the column by the selected number in the selected vertical column on the movable multiplier will be indicated by a number of the sheet adjacent the selected number on the multiplier.

2. A multiplying device formed as a sheet having numbers on the surface thereof arranged in vertical columns and horizontal rows, in each of which there is an arithmetical progression, a sliding multiplier movable over the said surface, such movable multiplier having a vertical column of numbers in arithmetical progression, and a rod guided at one end of the sheet for longitudinal movement and attached at the other end to the sliding multiplier, the last mentioned end of the rod spacing the sliding multiplier from the sheet to avoid wearing the surface thereof, so that when the multiplier is moved to proximity to a selected vertical column the product of multiplication of the number at the top of the said vertical column by the selected number on the movable multiplier, will be indicated by a number in the selected vertical column on the sheet adjacent the selected number on the multiplier.

In testimony whereof, I have signed my name at Milwaukee, Wisconsin, this 21st day of January, 1928.

REINHARDT SCHARF.